Aug. 25, 1942.   F. B. HALFORD   2,294,177
PACKING RING
Filed Feb. 11, 1941
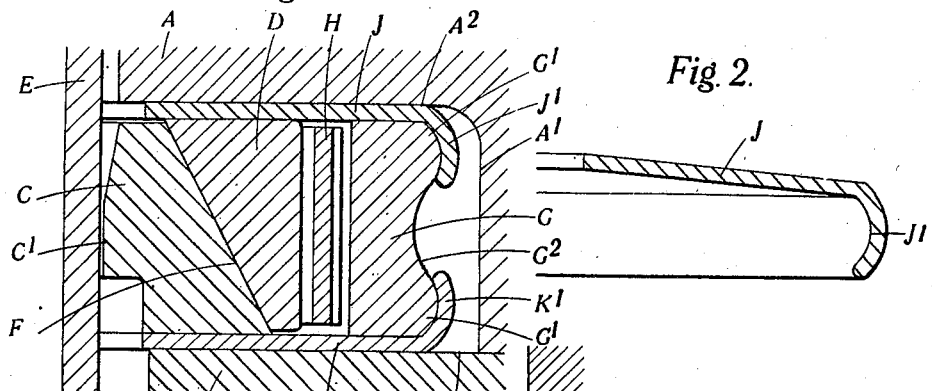
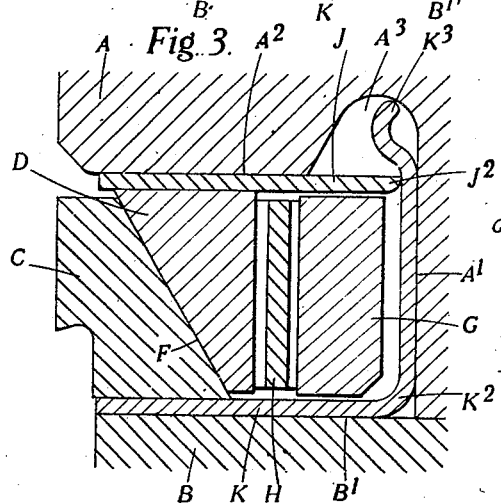
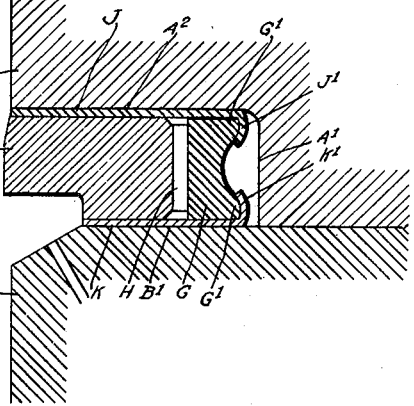
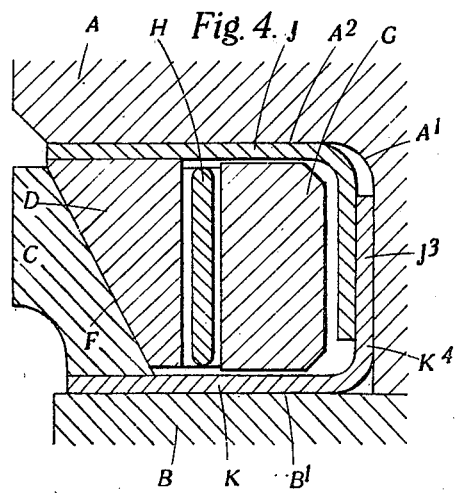
Inventor
F.B. HALFORD
by
Blair+Kilcoyne
Attorney Patented Aug. 25, 1942

2,294,177

UNITED STATES PATENT OFFICE 2,294,177

PACKING RING

Frank Bernard Halford, Edgware, England, assignor to D. Napier & Son Limited, London, England, a company of Great Britain Application February 11, 1941, Serial No. 378,447
In Great Britain February 24, 1940

10 Claims. (Cl. 286—24)

This invention relates to packing rings and more particularly to scraper rings for pistons or sleeve valves of internal combustion engines and the like. The invention is concerned with scraper rings of the type intended for use in a built-up groove whereof one flat side face is formed on a part detachable from that part which forms the cylindrical surface and the other flat side face of the groove. For example the invention is particularly applicable to a scraper ring acting on the outside of a sleeve valve and held in a groove whereof one flat side face is constituted by a part of the crank case whilst the other flat side face and the cylindrical surface constituting the bottom of the groove are formed in the end part of a cylinder detachable from the crank case. The invention is, however, also applicable to piston rings or junk rings provided that in each case the piston or junk head is built up so that the ring can be placed in position without expansion or contraction.

An object of the invention is to provide a form of scraper ring assembly which is comparatively easy to fit to the engine and which will reduce wear of the flat side faces of the groove which, for example, may be constituted, as above mentioned, by a crank case and a cylinder of which it is particularly desirable to minimise wear.

A scraper ring assembly according to this invention comprises in combination with a groove built up in the manner indicated above, one or more split rings lying in the groove and two washer-like members which are disposed between the flat sides of the groove and the adjacent faces of the ring or rings. It may be said that the washer members in effect together form a liner for at least the sides of the groove. The surface of each split ring which lies adjacent to a side of the groove measures in the radial direction less than the full radial depth of the groove. Preferably there is a pair of split rings and these are conveniently disposed one within the other in the groove with their surfaces which are in contact inclined and formed similarly conical with respect to the common axis of the rings. A backing ring member which may be integral or split lies between the split ring or rings and the bottom of the groove and a spring ring is interposed between this backing ring and the split ring or rings. The washer-like members which are disposed between these rings and the adjacent sides of the groove serve to hold together the complete assembly. Those peripheral parts of these members which lie in the bottom portion of the groove are formed to engage each other or the backing ring. In some cases one or both of the washer members may be connected, as by rivets, to the backing ring, or may be formed integral therewith.

Preferably the annular washer-like members are not flat, but are slightly dished so that they tend to exert a spring action as between the side walls of the groove and the adjacent faces of the rings in the assembly. The peripheral part of one or both of these washers which lies in the bottom portion of the groove, may be provided with a flange and where both are flanged these flanges may interengage, as by lying and being capable of sliding in the axial direction one within the other, or the flanges may be formed to engage the backing ring, as by being sprung on to its periphery. Again one ring only may have a flange and this may be of sufficient depth and so formed as to spring over and thus engage or interlock with the periphery of the other washer member. In effect the washer-like members either alone or together with the backing ring constitute a liner for the groove this liner being substantially U-shaped in cross-section and serving to hold together the rings comprised in the complete assembly. The flanged parts of the two washer members may be integral and the whole U-shaped liner thus formed may then be split to permit of the several rings in the assembly being inserted therein. It is however practicable to insert the split ring or rings even if the U-shaped liner is not split.

The accompanying drawing illustrates by way of example and in similar cross-sectional views several alternate ways in which the invention may be carried out in practice. In this drawing, Figure 1 shows an arrangement in which the washer-like members are sprung on to and thus engage the backing ring.

Figure 2 is a cross-sectional elevation of one of the washer-like members as used in the arrangement seen in Figure 1.

Figure 3 illustrates a construction in which peripheral parts of the two washer-like members are formed so that they can spring into engagement with each other.

Figure 4 shows an alternative arrangement in which each washer member is provided with a flange and these flanges engage by the one sliding in a telescopic manner within the other.

Figure 5 is a view of an arrangement similar to that shown in Figure 1, but in which there is only a single split ring.

The groove in which lies the complete scraper ring assembly is built up of two separable parts A and B of which the part A may be the end portion of the cylinder of an internal combustion engine, while the part B is a portion of the crank case on which the cylinder is mounted. In the cylinder part A is formed an annular recess comprising a cylindrical wall $A^1$ which constitutes the bottom of the groove, and a flat surface $A^2$ which forms the one side of the groove. On the crank case part B is a flat annular surface $B^1$ which constitutes the other side of the groove when the cylinder is in place.

In the arrangement illustrated in Figure 1 there is a pair of split rings C and D of which the ring C is formed as at $C^1$ on its inner side to act as a scraper on the outer surface of a sleeve valve E. The ring C lies inside the ring D and the surfaces of the two rings which are in contact at F are oppositely bevelled off or inclined so as to be similarly conical in relation to the common axis of the rings. This construction will tend to cause the two rings to move in the groove in opposite axial directions and thus towards the side walls of the groove. The face or surface of the ring C or of the ring D which lies adjacent to a side of the groove measures in the radial direction less than the full radial depth of the groove in which the rings lie.

Between the ring D and the bottom $A^1$ of the groove is a backing ring member G which in this case is split, but if desired may be formed integral. The outer side of this ring G which lies at or near the bottom wall $A^1$ of the groove, is formed with two similar annular ribs $G^1$ on either side of an annular groove $G^2$, the ribs and the groove being smoothly rounded as shown in the cross-section. A spring ring H is placed between the split ring D and the backing ring G.

The above described rings C, D, G and H, comprised in the complete scraper ring assembly are held together by two annular washer-like members J and K which in this case are formed similar each having on its periphery a flange $J^1$, $K^1$. Each of these flanges is curved so as to present a smooth annular concavity on the inside and is thus adapted to be sprung over and engage one of the ribs $G^1$ on the backing ring G in the manner seen in Figure 1. One of these washers J is shown in Figure 2 where it will be seen that it is not flat, but slightly dished as it appears initially before it is in place in the groove. Being made of resilient material this formation causes the washers to spring outwardly into the contact with the walls $A^2$ and $B^1$ of the groove. Hence if owing to vibration any clearance tends to exist it will be between the split rings C and D and the washers J and K rather than between these washers and the sides $A^2$ and $B^1$ of the groove and thus it will be the rings and the washers which tend to wear rather than the adjacent parts of the cylinder A and crank case B. When the washers J and K are in place on the backing ring G they together form a U-shaped liner for the groove and on the other hand they hold together all the ring members comprised in the complete assembly.

If it is required to dismantle the assembly in order to renew a part or for some other purpose, this can be done easily by springing one of the washers J or K off the backing ring G when the rings within the liner can be separated and subsequently reassembled. When assembled the liner formed by the parts J, K and G, holds the several rings together in a single unit and thus facilitates the fitting of the ring to the engine especially where it is a case of fitting the ring to a cylinder which has afterwards to be bolted down on to a crank case.

Referring now to certain alternative ways in which the invention may be carried out in practice, in the arrangement shown in Figure 3 it will be seen that the washer members J and K do not engage with the backing ring which is here made as a plain and solid ring, that is to say the ring is not split. On the other hand the washers interengage at their peripheral parts. The washer K is provided with a cylindrical flange $K^2$ along the edge of which is formed a bead $K^3$ adapted to be sprung over the rounded edge $J^2$ of the washer J. The liner is thus composed wholly of the two washer members J and K. The beaded edge $K^3$ of the washer K lies in an annular recess $A^3$ in the side wall $A^2$ of the groove. Instead of a beading the flange $K^2$ may be provided at its edge with spring fingers which will engage the edge of the washer J.

In the construction illustrated in Figure 4 each washer member J and K is formed with a similar annular cylindrical flange $J^3$ $K^4$, but the diameters of these flanges differ so that the one $J^3$ can lie and slide in a telescopic manner within the other flange $K^4$. These flanges lie between the backing ring G and the bottom $A^1$ of the groove. In this way again the two washers alone constitute the liner and the backing ring G is separate and lies within the liner.

Figure 5 shows a scraper ring assembly in which there is only one split ring. This ring $C^1$ acts as a scraper and has behind it a spring ring H which lies between the split ring and the backing ring G which is positioned in the bottom portion of the groove. As in the construction shown in Figure 1 and described above, the part of the backing member G which lies adjacent to the bottom wall $A^1$ of the groove is formed with annular ribs $G^1$ on to which are sprung the curved flanges $J^1$ and $K^1$ of the two washer members J and K by which the parts comprised in the complete assembly are kept together prior to their insertion in the groove.

The invention has been more particularly described above as applied to a scraper ring assembly for use on the outside of a sleeve valve, but it is to be understood that it may also be applied to piston rings or junk rings. Where the ring engages an inner surface such as that of a sleeve valve or cylinder it will be apparent that the split rings C and D will then lie outermost with the spring ring H next to them and the backing ring G inside. The washer members J and K will then be so dished that their outer peripheral parts will tend to be distanced further apart in the axial direction than their inner peripheries.

Where the backing ring is split it may be made so that the two ends thereof will mutually engage or can be locked together in a known manner. It is to be noted that the invention may be used in a scraper or other ring assembly in which no backing or like ring is needed.

What I claim as my invention and desire to secure by Letters Patent is:

1. A scraper ring assembly comprising in combination with a groove built up of at least two separable members, at least two split rings of which one functions as a scraper and both lie in the groove, and two annular washer members each of which is slightly dished these two members being respectively disposed between the flat sides of the groove and the adjacent faces of the split rings.

2. A scraper ring assembly comprising in combination with a groove built up of at least two separable members, at least two split rings of which one functions as a scraper and both lie in the groove, a backing ring which lies in the bottom portion of the groove, a spring ring which is interposed between the backing ring and the split rings, and two dished annular washer members disposed between the flat sides of the groove and the adjacent faces of the split rings those peripheral parts of these members which lie in the bottom portion of the groove being connected.

3. A scraper ring assembly comprising in combination with a groove built up of at least two separable members, at least two split rings of which one functions as a scraper and both lie in the groove, a backing ring which lies in the bottom portion of the groove, a spring ring which is interposed between the backing ring and the split rings, and two annular washer members disposed between the flat sides of the groove and the adjacent faces of the split rings those peripheral parts of these members which lie in the bottom portion of the groove being formed to interengage so that the washer members form a liner for at least the sides of the groove.

4. A scraper ring assembly comprising in combination with a groove built up of at least two separable members, at least two split rings of which one functions as a scraper and both lie in the groove, a backing ring which lies in the bottom portion of the groove, a spring ring which is interposed between the backing ring and the split rings, and two dished annular washer members disposed between the flat sides of the groove and the adjacent faces of the split rings those peripheral parts of these members which lie in the bottom portion of the groove being formed to interengage so that the washer members form a liner for at least the sides of the groove.

5. A scraper ring assembly comprising in combination with a groove built up of at least two separable members, at least two split rings of which one functions as a scraper and both lie in the groove, a backing ring which lies in the bottom portion of the groove, a spring ring which is interposed between the backing ring and the split rings, and two dished annular washer members disposed between the flat sides of the groove and the adjacent faces of the split rings those peripheral parts of these members which lie in the bottom portion of the groove being connected through the backing ring so that the washer members and the backing ring together form a liner for the groove.

6. A scraper ring assembly comprising in combination with a groove built up of at least two separable members, at least two split rings of which one functions as a scraper and both lie in the groove, and two dished annular washer members disposed between the flat sides of the groove and the adjacent faces of the split rings the peripheral part of at least one of these members which lies in the bottom portion of the groove being provided with a flange through which the washer members are connected.

7. A scraper ring assembly comprising in combination with a groove built up of at least two separable members, at least two split rings of which one functions as a scraper and both lie in the groove, a backing ring which lies in the bottom portion of the groove, a spring ring which is interposed between the backing ring and the split rings, and two annular dished washer members disposed between the flat sides of the groove and the adjacent faces of the split rings those peripheral parts of these members which lie in the bottom portion of the groove being adapted to separably engage the backing ring so that the washer members hold together the complete assembly as set forth.

8. A scraper ring assembly comprising in combination with a groove built up of at least two separable members, at least two split rings of which one functions as a scraper and both lie in the groove, a backing ring which lies in the bottom portion of the groove, a spring ring which is interposed between the backing ring and the split rings, and two annular dished washer members disposed between the flat sides of the groove and the adjacent faces of the split rings the peripheral part of each of these members which lies in the bottom portion of the groove being provided with a flange and these flanges being adapted to separably engage the backing ring so that the washer members hold together the complete assembly as set forth.

9. A scraper ring assembly comprising in combination with a groove built up of at least two separable members, at least one split ring which functions as a scraper and lies in the groove, and two annular washer members each of which is slightly dished, these two washer members being respectively disposed between the flat sides of the groove and the adjacent faces of the scraper ring.

10. A scraper ring assembly comprising in combination with a groove built up of at least two separable members, at least one split ring which functions as a scraper and lies in the groove, a backing ring which lies in the bottom portion of the groove, a spring ring which is interposed between the backing ring and the scraper ring, and two annular washer members each of which is slightly dished, these two washer members being respectively disposed between the flat sides of the groove and the adjacent faces of the several rings in the groove.

FRANK BERNARD HALFORD.